US012401170B2

(12) United States Patent
Zhang et al.

(10) Patent No.: US 12,401,170 B2
(45) Date of Patent: Aug. 26, 2025

(54) METHODS AND SYSTEMS FOR PULSED BEAM PHASE LOCKING

(71) Applicant: XANADU QUANTUM TECHNOLOGIES INC., Toronto (CA)

(72) Inventors: Yanbing Zhang, Toronto (CA); Varun Vaidya, Toronto (CA)

(73) Assignee: XANADU QUANTUM TECHNOLOGIES INC., Toronto (CA)

( * ) Notice: Subject to any disclaimer, the term of this patent is extended or adjusted under 35 U.S.C. 154(b) by 657 days.

(21) Appl. No.: 17/827,929

(22) Filed: May 30, 2022

(65) Prior Publication Data

US 2023/0387647 A1 Nov. 30, 2023

(51) Int. Cl.
| | |
|---|---|
| H01S 3/00 | (2006.01) |
| G02F 1/35 | (2006.01) |
| G02F 1/39 | (2006.01) |
| H01S 3/10 | (2006.01) |
| H01S 3/102 | (2006.01) |

(52) U.S. Cl.
CPC .......... *H01S 3/1024* (2013.01); *H01S 3/0085* (2013.01); *H01S 3/10015* (2013.01)

(58) Field of Classification Search
CPC .. H01S 3/1024; H01S 3/0085; H01S 3/10015; H01S 3/2391; H01S 3/0092; G02F 1/3536; G02F 1/392; G02F 2203/56
See application file for complete search history.

(56) References Cited

U.S. PATENT DOCUMENTS

| | | | |
|---|---|---|---|
| 2005/0157760 A1* | 7/2005 | Rice ................. | G02F 1/3534 372/6 |
| 2006/0061853 A1* | 3/2006 | Chraplyvy ........ | G02F 1/353 359/330 |
| 2013/0071113 A1* | 3/2013 | McKinstrie ...... | H04B 10/291 398/183 |
| 2013/0208334 A1* | 8/2013 | Kakande .......... | H04B 10/291 359/279 |
| 2013/0223459 A1* | 8/2013 | Radic .............. | G02F 1/3534 372/20 |

* cited by examiner

*Primary Examiner* — Xinning(Tom) Niu
(74) *Attorney, Agent, or Firm* — Norton Rose Fulbright Canada LLP

(57) ABSTRACT

A pump source configured to generate a pulsed optical beam. The pump source generates a first light beam, a second light beam, and a third light beam, where the first, the second, and the third light beams satisfy a phase relationship. Each of the first, the second, and the third light beams are independently modulated in separate modulation paths and recombined as a pulsed optical beam. A portion of the pulsed optical beam is parametrically amplified within a nonlinear optical medium, where a resulting amplification gain is proportional to a phase difference between the first, second, and third modulated light beams. The power value of the amplified beam is measured as an indication of the phrase difference between the three beams and a corrective phase adjustment based on the error correction signal is applied on any one of the first, second, and third modulation paths to maintain the phase relationship.

19 Claims, 4 Drawing Sheets

METHODS AND SYSTEMS FOR PULSED BEAM PHASE LOCKING

RELATED APPLICATIONS

This is the first patent application related to the instant technology.

TECHNICAL FIELD

The present application relates to light beam generation, and in particular to generating pulsed light beams.

BACKGROUND

Squeezed light (also referred to as light in a squeezed state) refers to light in which the electric field strength for some phases has a quantum uncertainty (also referred to as noise) smaller than that of a coherent state. Squeezed light has been found to have high degrees of applicability in the area of quantum information processing and communication, particularly as a means of deterministically generating massive highly entangled quantum states, enabling the construction of scalable quantum states, and computation devices operating in the optical domain using a continuous-variable (CV) encoding.

Squeezed light is typically generated from light sources that typically employ three pulsed light beams, namely a first pump beam, a second pump beam, and a local oscillator beam. The three beams need to maintain certain phase relationships in order to allow successful generation of squeezed light. A great deal of effort has gone into maintaining the phase, or phase locking, the three beams. However, it has been observed that existing phase locking efforts suffer from one or more of high fabrication cost, increased circuit complexity with additional circuit elements, and deteriorating phase stability with increased frequency separation between the beams.

Accordingly, it is desirable to provide a method and system of pulsed beam generation with improved phase-locking capabilities.

SUMMARY OF THE INVENTION

Even though the present disclosure describes the photon-number-resolving method and system with respect to a two-pulse pulse train, it is understood that the disclosure may be extended to pulse trains with three or more pulses.

According to a first example aspect, there is provided a pump source for generating a pulsed optical beam, the pump source comprising: a generation module configured to provide a first light beam, a second light beam, and a third light beam, where the first light beam, the second light beam, and the third light beam satisfy a phase relationship; a modulation module, wherein each of the first light beam, the second light beam, and the third light beam are independently modulated in a first modulation path, a second modulation path, and a third modulation path, respectively, the modulated first, second, and third light beams are combined into a pulsed optical beam; a detection module configured to: parametrically amplify a portion of the combined pulsed optical beam, where an amplification gain is proportional to a phase difference between the first, second, and third modulated light beams; generate an error correction signal based on a power value of the amplified beam; and perform a phase adjustment based on the error correction signal on one of the first, second, and third modulation paths to maintain the phase relationship.

According to a second example aspect, there is provided a method of generating a pulsed optical beam, the method comprising: generating a first light beam, a second light beam, and a third light beam, where the first light beam, the second light beam, and the third light beam satisfy a phase relationship; modulating each of the first light beam, the second light beam, and the third light beam independently in a first modulation path, a second modulation path, and a third modulation path, respectively, the modulated first, second, and third light beams are combined into a pulsed optical beam; parametrically amplifying a portion of the pulsed optical beam, wherein an amplification gain is proportional to a phase difference between the first, second, and third modulated light beams; generating an error correction signal from a power value of the amplified beam; and performing a phase adjustment on one of the first, second, and third modulation paths based on the error correction signal to maintain the phase relationship.

In any of the above aspects, the detection module further may include a nonlinear optical medium characterized by a non-linear optical susceptibility, wherein the portion of the pulsed beam is parametrically amplified within the optical medium.

In any of the above aspects, the first light beam, the second light beam, and the third light beam may overlap in one or more of polarization and temporal domain.

Any of the above aspects may further comprise a phase modulator on the one of the first, second, and third modulation paths, wherein the phase modulation is driven by the error correction signal to apply the phase adjustment.

Any of the above aspects may further comprise a demodulator to generate the error correction signal based on the amplified beam.

In any of the above aspects, the demodulator may generate the error correction signal using one or more of dither and lock-in amplification techniques.

In any of the above aspects, the phase relationship may be a relative phase difference between the first light beam, the second light beam, and the third light beam.

In any of the above aspects, the relative phase difference may be expressed as $\Delta\varphi = \varphi_1 + \varphi_2 - 2\varphi_{LO}$, where $\varphi_1$ is an angular frequency of the first light beam, $\varphi_{LO}$ is an angular frequency of the second light beam, and $\varphi_2$ is an angular frequency of the third light beam.

In any of the above aspects, the portion of the pulsed optical beam may be 10% of a total power of the pulsed optical beam.

In any of the above aspects, the generation module may further comprise: a first pump to generate the first light beam; a second pump to generate the second light beam; and a non-linear optical medium characterized by a non-linear optical susceptibility, wherein the first light beam and the second light beam undergo a parametric process to generate the third light beam.

In any of the above aspects, the generation module may further comprise: a first pump configured to generate the first beam; a second pump configured to generate the second beam; a third pump configured to generate the third beam; and a frequency comb configured to generate at least a first frequency, a second frequency and a third frequency, where the first, second, and third frequencies satisfy the phase relationship; wherein the first beam, the second beam, and the third beam are phase locked onto the first frequency, the second frequency, and the third frequency, respectively.

In any of the above aspects, the parametric amplifying may include amplifying a portion of the pulsed optical beam through Stimulated Four Wave Mixing.

Any of the above aspects may further include overlapping the first light beam, the second light beam, and the third light beam in one or more polarization and temporal domain.

Any of the above aspects may further include demodulating the amplified beam to generate the error correction signal.

In any of the above aspects, the demodulating may further include applying one or more of dither and lock-in techniques.

In any of the above aspects, the performing an error adjustment may further include driving a phase modulator placed on the one of the first modulation path, the second modulation path, and the third modulation path with the error correction signal to maintain the phase relationship.

In any of the above aspects, the phase relationship may be expressed as $\Delta\varphi = \varphi_1 + \varphi_2 - 2\varphi_{LO}$, where $\varphi_1$ is an angular frequency of the first light beam, $\varphi_{LO}$ is an angular frequency of the second light beam, and $\varphi_2$ is an angular frequency of the third light beam.

In any of the above aspects, the generating step may further include: generating the first light beam by a first pump; generating the second light beam by a second pump; and generating the third light beam by an optical medium characterized by a non-linear optical susceptibility, wherein the first light beam and the second light beam undergo a parametric process within the optical medium to generate the third light beam.

In any of the above aspects, the generating step may further include: generating the first light beam by a first pump; generating the second light beam by a second pump; generating the third light beam by a third pump; generating a first frequency, a second frequency, and a third frequency by a frequency comb, the first frequency, the second frequency, and the third frequency satisfy the phase relationship; phase locking the first beam, the second beam, and the third beam onto the first frequency, the second frequency, and the third frequency, respectively.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

Figure 1:
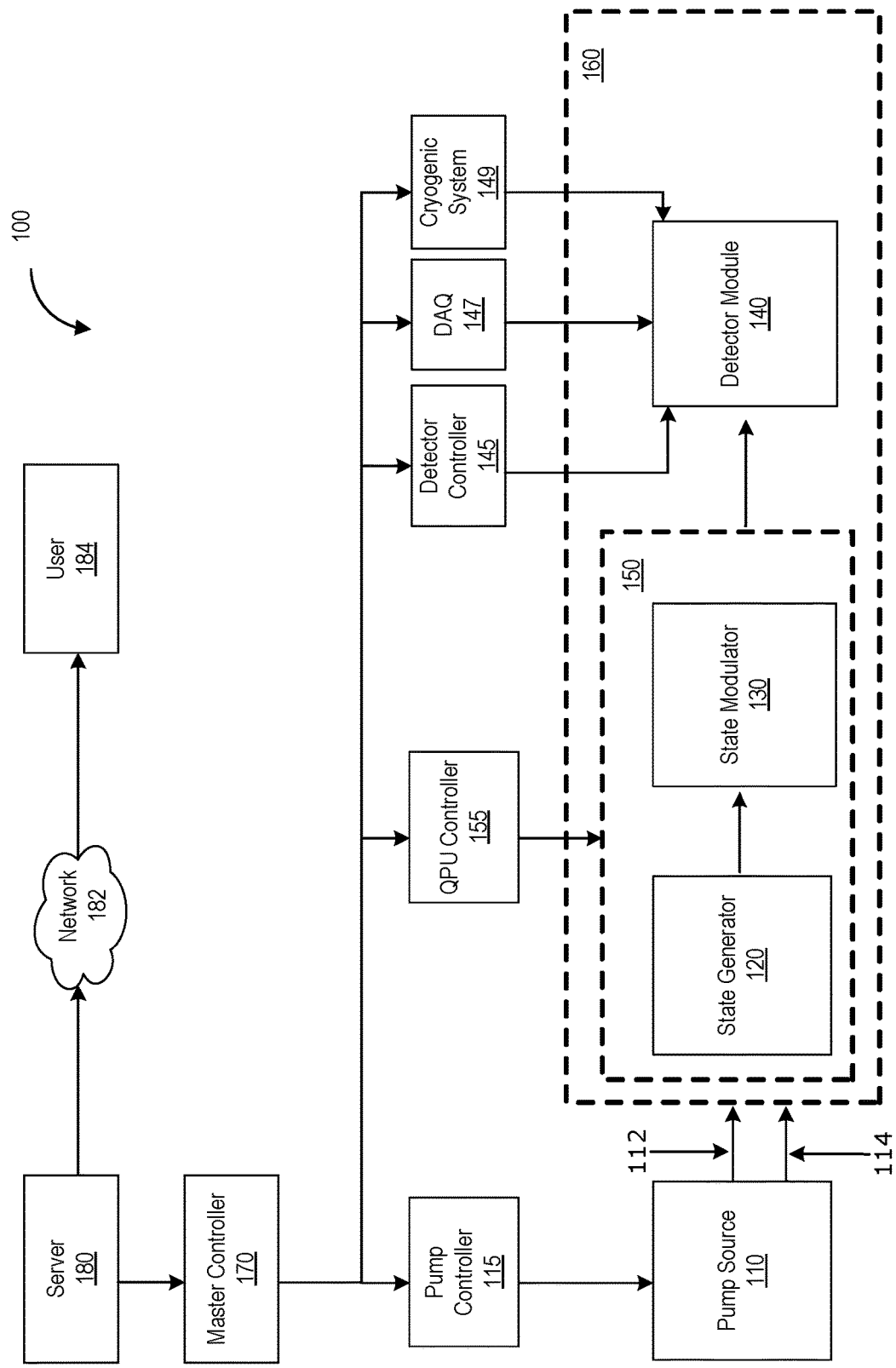
FIG. 1 illustrates a simplified schematic diagram of a quantum signal processing system for performing quantum signal processing on a photonics platform in accordance with an exemplary embodiment.

Pulsed squeezed states of light are one of the fundamental building blocks of the realization of photonic quantum computing based on continuous-variables. Any quantum source configured to generate a pulsed squeezed state of light should ideally possess high temporal purity, single-frequency, and tunable squeezing amount while maintaining other properties. In "Squeezed light from a nanophotonic molecule" by Zhang Y. et. al., (Nature Communications (2021) Apr. 14; 12(1): 1-6), the disclosure of which is incorporated herein in its entirety, the parametric process of degenerate spontaneous four-wave mixing (SFWM) in nanophotonic resonators has been demonstrated as a scalable method to produce pulsed squeezed states with low noise and high spectral purity. This method typically uses two pulsed pump lasers separated by >10 nm (i.e. 1.25 THz at 1550 nm) in wavelength which can be efficiently filtered out to produce a squeezed state between the two pump wavelengths that is uncontaminated by light from the pump lasers. Detection and temporal characterization of such squeezed states may be done through balanced homodyne detection, using a pulsed local oscillator beam at the wavelength of the squeezed light (Zhang Y. et al Nature Comm. 12.1 (2021)).

The squeezed state of light is highly phase-sensitive, and the phase of the local oscillator beam needs to be stable with respect to the two pump beams. In particular, if $\theta_1$, $\theta_2$, $\theta_{LO}$ are the phases of the photons in a beam of light generated from a first pump (P1), a second pump (P2) and the local oscillator (LO) respectively, the condition $\theta_1 + \theta_2 - 2\theta_{LO} = k$, where k is a constant, must be met. Phase-stabilization of lasers separated by microwave frequencies (i.e. in the gigahertz (GHz) frequency range) can be readily implemented using standard high-speed photodetectors and optical phase-locked loops (OPLLs). For separations larger than microwave frequencies (i.e. in the terahertz (THz) range), as required in the case of the degenerate SFWM method, optical frequency combs may be used in conjunction with OPLLs to bridge the gap between the microwave and optical domain. However optical frequency combs come with the added complexity of requiring another laser in the system, along with the need to stabilize the repetition rate and carrier envelope offset of the comb laser. Furthermore, the phase stability of frequency combs degrades with separation between the lasers due to a quadratic scaling of frequency noise with comb tooth index as more fully described in the academic literature "Characterization of a DFG comb showing quadratic scaling of the phase noise with frequency" by Puppe, T. et al. (Opt. Lett. 41, 1877 (2016)), the content of which is incorporated herein in its entirety.

Academic literature, including "Subhertz linewidth diode lasers by stabilization to vibrationally and thermally compensated ultralow-expansion glass Fabry-Pérot cavities" by Janis Alnis, Arthur Matveev, Nikolai Kolachevsky, Th. Udem, and T. W. Hänsch (Physical Review A 77, no. 5 (2008): 053809), describes another alternative approach to achieve phase-locking in the THz range by stabilizing the frequencies of multiple lasers using a single ultra-low expansion (ULE) cavity. However, such cavities have a high fabrication cost and must be isolated inside a vacuum to prevent acoustic noise in air from deteriorating the inherent stability of the cavity.

In one aspect, the present invention provides a method of phase locking a first pump beam (P1) a second pump beam (P2), and a local oscillator (LO) beam using a parametric process in a non-linear optical medium. In the non-linear optical medium, each beam experiences phase-sensitive amplification dependent on the relative phase between it and the other two beams, whereby a phase-dependent power value of any one of the beams may be measured to provide an indication as to a phase relationship between a first pump beam (P1), a second pump beam (P2), and a local oscillator (LO) beam. Based on the measured phase-dependent power value, a corresponding error value is generated and injected back into the modulation path of one of the three light beams to maintain the phase-locking relationship between the first pump beam, the second pump beam, and the LO beam.

Although some examples of the present disclosure are described in the context of quantum signal processing, the teachings of the present disclosure may be implemented in other forms of classical optical pumping photonics systems and other quantum signal processing systems relying on phase-amplification parametric amplification, such as phase and amplitude optical regeneration, broadband squeezing detection, and in-line amplification of entangled photons.

FIG. 1 is a simplified schematic diagram illustrating a quantum signal processing system 100 for performing quantum signal processing on a photonics platform in accordance with an exemplary embodiment. Although the present disclosure is described in the context of a quantum signal processing system, the embodiments described herein may also be adopted for any other optical pumping setup in both classical and quantum signal processing systems that rely on phase-sensitive parametric amplification. It is noted that in FIG. 1, the block arrows indicate optical connection, and the lined arrows indicate electrical connection.

The system 100 includes a pump source 110, the output of which includes a first pump beam 112 and a local oscillator (LO) beam 114. The first pump beam 112 and LO beam 114 are optically connected to a state generator 120. A state modulator 130 is configured to perform unitary transformations on the input states of light received from the state generator 120. A detector module 140 is configured to measure the output of the state modulator 130 (e.g., output optical modes, also referred to as transformed optical modes). The combination of the state generator 120 and the state modulator 130 may also be referred to as a quantum processing unit (QPU) 150, and together with the detector module 140 may be referred to as a quantum hardware (QH) 160.

The pump source 110, as described in more detail below, is configured to provide continuous wave (CW) pump beams 112 and 114, such as laser beams, for the state generator 120 to generate the appropriate input states. In some embodiments, the input state generator 110 can be configured to generate optical modes using time encoding. In these embodiments, different optical modes are characterized by longitudinal distributions that do not overlap in space. For example, each optical mode can include a well-defined optical pulse in a single longitudinal path. In some embodiments, a pump controller 115 is operatively coupled to the pump source 110 to control the operation of the pump source 110, such as controlling the pump level (e.g., intensity) of the pump beams. The pump controller 115 can include one or more FPGAs, ASICs, GPUs and/or CPUs.

The state generator 120 is configured to generate the input states (e.g., coherent state or vacuum state) as optical beams or optical pulses (e.g. squeezed light). In some embodiments, the state generator 120 is also referred to as a light source 120. For example, the state generator 120 converts the CW pump beams 112 and 114 from the pump source 110 and creates, via a non-linear optical element, a total number M of squeezed and/or displaced squeezed states of light, which can be represented by:

$$\Pi_{i=1}^{M} D_i(\alpha) S_i(r_i)|vac\rangle \quad \text{Equation (1)}$$

where $D_i(\alpha) = \exp(\alpha \alpha_i^+ - \alpha^* \alpha_i)$, and $$S_i(r) = \exp\left(\frac{r}{2} a_i a_i - \frac{r^*}{2} a_i^+ a_i^+\right),$$

i is the mode number, $r_i$ is the squeezing factor, and $a_i$ is an annihilation operator. In some embodiments, the squeezing factor and displacement in each mode can be independently adjusted to encode different applications into the system 100. In some embodiments, the displacement variable $\alpha$ can also be different for each mode, i.e., each mode i has a corresponding displacement $\alpha_i$ in the above Equation (1).

The modes i generated by the input state generator 120 (i.e., the state encoding) can correspond to any appropriate set of quantum harmonic oscillator modes. Optical field modes are used here as illustrating examples. In general, an optical field mode can be characterized by frequency/time, polarization, and spatial distribution.

In some embodiments, the state generator 120 can be configured to generate optical modes using spatial encoding. In these embodiments, different optical modes are characterized by transverse field distributions that do not overlap in space. For example, different optical modes can include separate light beams, which can either propagate in free space or in separate optical waveguides.

In some embodiments, the state generator 120 can be configured to generate optical modes using frequency encoding. In these embodiments, different optical modes are characterized by frequency distributions that do not overlap in frequency, i.e., each optical mode has a distinct frequency or wavelength. In some embodiments, the state generator 120 can employ more than one encoding scheme to prepare the input optical modes, i.e., using a hybrid scheme.

The state modulator 130 is configured to perform a unitary transformation on up to N input states or input nodes, and therefore transforms the input mode operator $\alpha_i^+$ in Equation (1), with a photon in mode i represented by $\alpha_i^+|vac\rangle$, to the output mode operator $\Sigma_{j=1}^{N} U_{ij} \alpha_j^+$, where U is the unitary operator. Different unitary operators $U_{ij}$ can be programmed into the state modulator 130 for each run of the QH 160 in the system 100.

The detector module 140 in the system 100 has photon counting capability, i.e., the detector module 140 is configured to measure the number of photons in each output mode of the state modulator 130. Without being bound by any particular theory or mode of operation, each output mode of the state modulator 130 can be represented by the projection-valued measure elements $$\prod_{i}^{N} = \frac{1}{N_i!}(a_i^+)^N|vac\rangle\langle vac|(a_i)^N.$$

In some embodiments, the system 100 can include multiple waveguides to propagate optical modes in spatial encoding. For example, the state modulator 130 can include M input ports to receive the M input optical modes, and each port can be coupled to an input waveguide that propagates a distinct input optical mode. In addition, the output modes of the state modulator 130 can also be transmitted to the detector module 140 via waveguides. In this case, the detector module 140 can include an array of photon counting detectors, each of which is coupled to a corresponding output port of the state modulator 130 to measure the number of photons in the output optical mode delivered from the output port.

Optionally, the system 100 also includes a detection controller 145 to control the operation of the detector module 140, and a QPU controller 155 to control the operations of the QPU 150.

The QPU controller 155 (may also be referred to as a QPU driver) is operatively coupled to the QPU 150 for configuring, programming, and operating the elements of the QPU 150. For example, the QPU controller 155 can include a suitable voltage/current driver for on-chip electrical elements (e.g., phase shifters) that are included in the QPU 150. The QPU controller 155 may include a generator controller (not shown) and a modulator controller (not shown) for controlling operations of the state generator 120 and state modulator 130, respectively.

In some embodiments, a locking loop controller (not shown) may be employed for any active feedback systems associated with the QPU 150, such as locking loops for resonant devices.

In some embodiments, the QPU 150 is also operatively coupled to a QPU environment controller (not shown), which is configured to control the mechanical, thermal, and/or optical environment of the QPU 150. For example, the QPU environment controller can be configured to ensure that the QPU 150 is operating within a stable environment (e.g., low level of temperature fluctuations, etc.). In some embodiments, one or more monitor photodiodes may be operatively coupled to the QPU 150 and the QPU environment controller for assessing the stability of the QPU elements. The monitor photodiodes can be configured to measure operation parameters (e.g., optical output) of the QPU 150 and provide the measurement to the QPU environment controller so as to allow the QPU environment controller to generate appropriate control signals.

Any one of the QPU controller 155, the locking loop controller, and the QPU environment controller can include one or more field-programmable gate arrays (FPGAs), application specific integrated circuits (ASICs), graphics processing units (GPUs), and/or central processing units (CPUs). The use of FPGAs, ASICs, GPUs and/or CPUs can result in increased operational speed, reliability and flexibility, as well as lower monetary cost, as compared with customized integrated circuits.

In some embodiments, a master controller 170 is employed to coordinate and/or control the operations of the three controllers 115, 145, and 155 as well as the locking loop controller and the QPU environment controller. The controllers 115, 145, and 155 and the locking loop controller and the QPU environment controller may be computing devices executing drivers to perform control logic and actuate the various subsystem hardware elements. The master controller 170 can include a computer that co-ordinates the control logic of the sub controllers 115, 145, and 155, as well as the locking loop controller, and the QPU environment controller. For example, the master controller 170 can be configured to receive instructions from a user and then send the received instructions to one or more specific sub controllers.

It should be understood that the controllers 115, 145, 155, 170 as well as the locking loop controller and the QPU environment controller are not necessarily separate units of the system 100, and that the illustration and description of the controllers as separate elements within the system 100 may only be a conceptual representation of the overall operation of the system 100.

Optionally, a data acquisition system (DAQ) 147 controlled by master controller 170 may be operatively coupled to the detector module 140 to translate the output signals of the detector module 140 into a series of integers representing photon number readout, which can then be reported to users.

In some embodiments, the master controller 170 may be configured to control an optional cryogenic controller (not shown) that can be employed to control a cryogenic system 149 in support of the operation of the detector module 140.

The system 100 further includes an optional server 180 for networking the system, via network 182, to a user terminal 184. The user terminal 184 can include any user hardware for accessing the system 100. Network 182 may be any of LAN, WLAN, internet, etc. In some embodiments, the server 180 may include an application program interface (API) through which the user terminal 184 can communicate instructions to, and receive outputs from, the master control 170 via secure/encrypted communication links.

Figure 2:
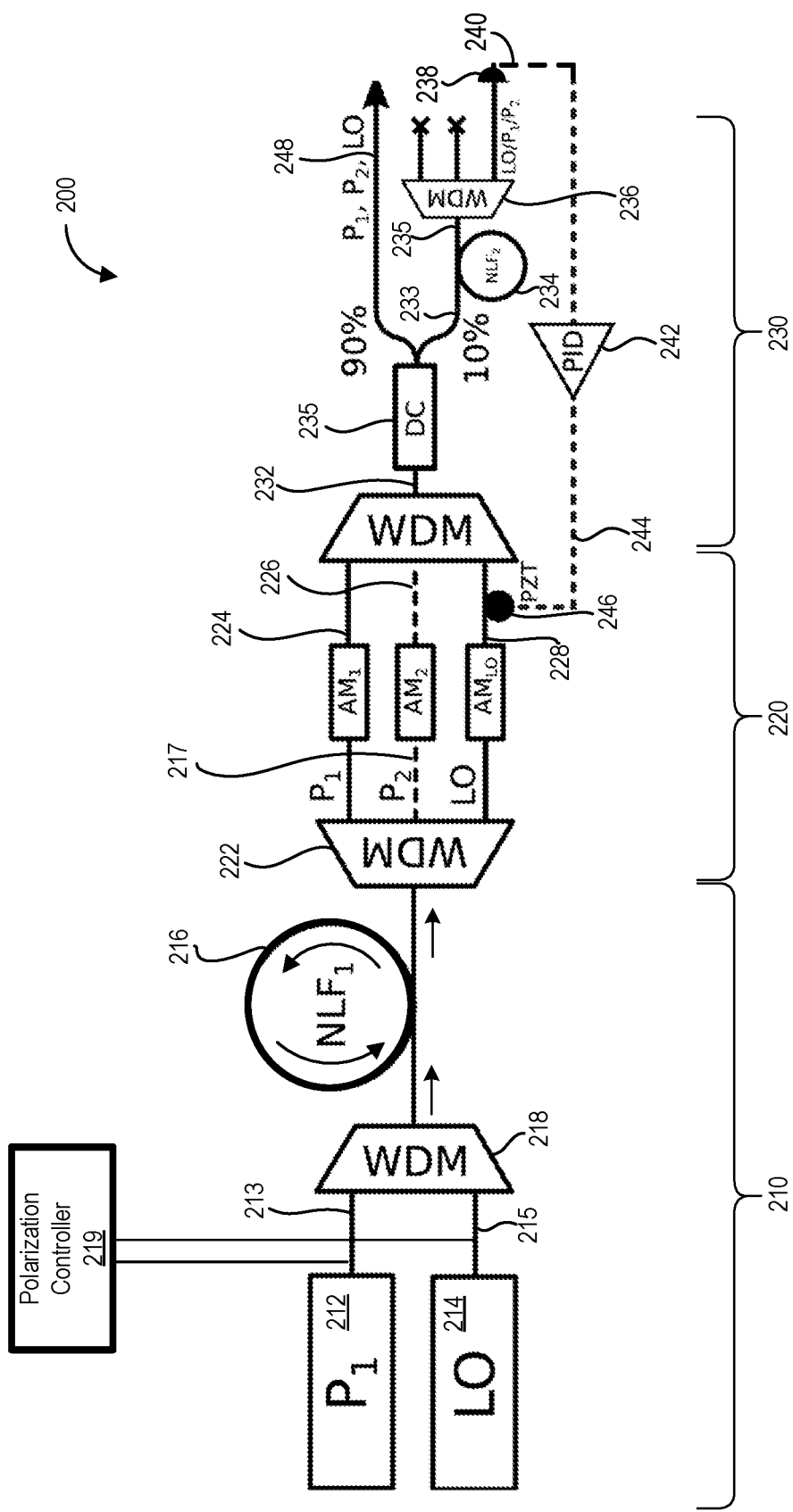
FIG. 2 illustrates a simplified block diagram of an exemplary embodiment of the pump source in FIG. 1.

FIG. 2 illustrates a simplified block diagram of an exemplary embodiment of pump source 200 in accordance with an exemplary embodiment of the present disclosure. The pump source 200 may be used to implement pump source 110 in FIG. 1. For the ease of understanding, the pump source 200 may be conceptualized as comprising of three modules: generation module 210, modulation module 220, and phase-detection module 230. As used here, a "module" can refer to a combination of a hardware processing circuit and machine-readable instructions (software and/or hardware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit. It should be understood that the modules 210, 220, and 230 are not necessarily separate units of the pump source 200, and that the illustration of the modules 210, 220, and 230 as separate blocks within pump source 200 may only be a conceptual representation of the overall operation of the pump source 200.

In the generation module 210 of the exemplary embodiment illustrated in FIG. 2, the pump system 200 employs a dual-pump configuration. Specifically, a first pump (P1) 212 is configured to generate a continuous-wave laser beam 213 characterized with angular frequency $\omega_1$ and phase angle $\varphi_1$. A local oscillator (LO) 214 is configured to generate a continuous-wave laser beam 215 characterized with angular frequency $\omega_{LO}$ and phase angle $\varphi_{LO}$, which is also referred to as LO beam 215. As described in more detail below, both beams 213 and 215 are continuous-wave laser beams that are used to generate a second pump beam (P2) 217. In turn, the first pump beam 213 and the second pump beam 217 are used to generate squeezed light via a parametric process, such as degenerate StFWM. The pump source 200 also includes a first nonlinear optical medium 216, such as a non-linear fibre (NLF), characterized by a third-order nonlinear optical susceptibility.

Both of the first pump 212 and the LO 214 are in optical communication with the optical medium 216. The first pump beam 213 generated from the first pump 212 and the LO beam 215 generated from the LO 214 are combined onto a single optical medium via a wavelength division multiplexer (WDM) 218. The combined continuous beam enters the non-linear optical medium 216 to generate a third coherent continuous-wave light beam, or second pump (P2) beam, 217 via a parametric process.

In some embodiments, the first pump 212 and/or the LO 214 are tunable to control the properties of the beams 213 and 215. The magnitude and phase angle of the squeezing parameters can be determined by the product of the amplitudes of the first pump beam 213 and the second pump beam 217. Accordingly, the magnitude and angle of the squeezing can be controlled by modulating one or both of the pump beams 213 and 215. In addition, the squeezing angle is determined by $2\theta_{LO}-\theta_1$, which is the locked phase condition of the first pump beam 213 and LO beam 215. Furthermore, the squeezing factor r in Equation (1) is proportional to φ, where φ is the non-linear phase shift that is proportional to the power product of the pump beams 213 and 215 with squeezing angle being defined as $$\frac{(\phi_1 + \phi_{LO})}{2}.$$

The squeezed output can therefore be calibrated against and controlled by the input powers and phases.

The two beams 213 and 215, after being combined through WDM 218, undergo a parametric process as the combined beam travels through the nonlinear optical medium 216. The direction of beam propagation is shown by the arrows in FIG. 2. The nonlinear optical medium 216 includes appropriate material that has a third-order susceptibility, such as silicon nitride, silicon, silica, lithium niobate, and aluminum nitride, among others. In some embodiments, the nonlinear optical medium 216 can be compatible with existing optical technologies and semiconductor fabrication processes such that the pump source 200 can be readily constructed on a mass scale.

The non-linear optical medium 216 can be configured, for example, as a resonator. In some embodiments, the resonator can be a linear resonator including two reflectors surrounding an optical material. In some embodiments, the nonlinear optical medium 216 can be configured as a ring resonator as illustrated in FIG. 2 to increase the efficiency of squeezed light generation.

Figure 3:
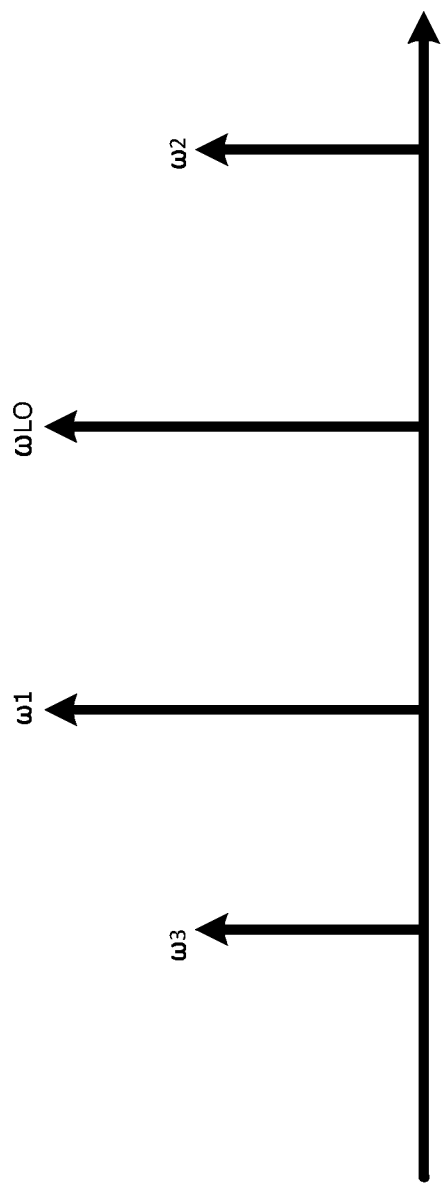
FIG. 3 illustrates a diagram showing frequency generation by stimulated four wave mixing process within a non-linear optical medium.

In some embodiments, the parametric process taking place within the optical medium 216 is a degenerate stimulated four-wave-mixing process (StFWM process). In some embodiments, the first pump beam 213 and the LO beam 215 differ in wavelength by >5 nm (i.e. 1.25 THz at 1550 nm). In some embodiments, the wavelength difference between the first pump beam 213 and the LO beam 215 is up to 100 nm, which still satisfies the phase matching within the non-linear medium as required by the parametric process. FIG. 3 illustrates two incident beams create a third beam through StFWM. During FWM between waves of two frequencies, a refractive index modulation occurs at the difference between the two frequencies, where each incident frequency creates two additional frequency components as illustrated in FIG. 3. For example, two frequency components at frequencies matching $\omega_1$ and $\omega_2$ are created as a result of the incident frequency $\omega_{LO}$ undergoing a spontaneous parametric process. By further injecting a second frequency component, namely at $\omega_1$, enhances the generation of the frequency component at $\omega_2$ through stimulated emission as required by the laws of energy conservation. A similar process also takes place for the frequency component $\omega_1$, where the presence of $\omega_{LO}$ enhances the generation of a frequency component $\omega_3$ through stimulated emission. The generated frequency components satisfy the conditions of $\omega_3=2\omega_1-\omega_{LO}$ and $\omega_2=2\omega_{LO}-\omega_1$. Although the beam characterized by $\omega_2$ is described as the second pump beam 217, it is understood that either one of the frequency components $\omega_2$ and $\omega_3$ may be used as a second pump beam $P_2$ 217.

Since squeezed states of light are phase-sensitive, the phase of the LO beam 215 needs to be stable with respect to the two pump beams 213 and 217. Through the parametric process, the second pump beam 217 (i.e. $\omega_2$) is generated in a phase-stable manner in that its phase relationship with respect to the first pump beam 213 and LO beam 215 is consistent, thereby removing the need for a high-bandwidth optical phase locked loop (OPLL) to stabilize laser phase noise. The phase stability achieved by the parametric process is described in more detail in "Gain characteristics of a frequency non-degenerate phase-sensitive fiber-optic parametric amplifier with phase self-stabilized input" by Tang R, Lasri J, Devgan P S, Grigoryan V, Kumar P, Vasilyev M. (Optics Express. 2005 Dec. 26; 13(26): 10483-93), the disclosure of which is incorporated herein in its entirety. In some embodiments, the parametric process inside the non-linear optical medium 216 ensures that the three beams are equally spaced in frequency space and intrinsically satisfy the phase condition $\Delta\phi=\phi_1+\phi_2-2\phi_{LO}=0$, where $\Delta\phi$ is the relative phase difference between the three beams.

Referring back to FIG. 2, an optional polarization controller 219 is used to ensure that P1 beam 213 and LO beam 215 have the same polarization at the input of non-linear optical medium 216 for maximum conversion efficiency to P2 217. In embodiments, where the P1 beam 213 and LO beam 215 are both polarized laser beams, the polarization controller 219 would not be needed. In some further embodiments, the StFWM process can be phase-matched over several THz in frequency, thereby removing the need for an optical frequency comb. By eliminating the need for frequency combs, the phase stability of the beams 213, 215, and 217 does not suffer from the quadratic scaling of phase noise shown to be associated with frequency combs. Consequently, pump system 200 would be less prone to degradation associated with separation between the three beams, and thus allowing for use of beams with greater wavelength separation. The increased wavelength separation may advantageously be less prone to phase noise and easier to spectrally filter out squeezed light from the pump wavelengths. By generating the second beam 217 as a result of the parametric process taking place within the nonlinear optical medium 216, the system 200 does not require an additional (i.e. a third) light source to generate the second pump beam 217.

In further embodiments, the generation module 210 may include three pump sources that are phase-locked to a frequency comb, which is configured to a series of discrete, equally spaced frequencies. A frequency comb may be implemented using a number of mechanisms, including periodic modulation (in amplitude and/or phase) of a continuous-wave laser, four-wave mixing in nonlinear media, stabilization of the pulse train generated by a mode-locked laser, or any other suitable method. The frequency comb includes frequencies of the first pump beam 213, the LO beam 215, and the second pump beam 217. In other words, the frequency comb includes at least three frequencies $\omega_1$, $\omega_2$, and $\omega_{LO}$, such that $\omega_1+\omega_2=2\omega_{LO}$. Each of the three pump sources would be phase-locked onto each of these frequencies and generate the respective beams. As mentioned above, the use of a frequency comb may introduce considerable phase noise. Additional phase stability elements, such as electro-optic phase modulators, may be included in the generation module 210 (not shown).

In some further embodiments, the generation module 210 includes a frequency comb configured to generate at least three frequencies $\omega_1$, $\omega_2$, and $\omega_{LO}$, such that $\omega_1+\omega_2=2\omega_{LO}$.

Three band-pass filters may be used to select the three frequencies $\omega_1$, $\omega_2$, and $\omega_{LO}$ to be used as beams 213, 217, and 215, respectively.

In an exemplary embodiment, the LO beam 215 may be at 1.25 THz at 1550 nm. The P1 beam 213 is at least 10 nm less than that of the LO beam. For example, P1 beam 213 may be at <1540 nm. The second pump beam 217 may be generated at least 10 nm more than that of the LO beam. For example, P2 beam 217 may be generated at >1560 nm.

Beams 213, 215, and 217 are outputted from the nonlinear optical medium 216 as a single light beam, which enters the modulation module 220. The modulation module 220 is configured to independently construct, or modulate each of the first pump beam, the second pump beam, and the LO beam into their desired pulse shapes, such as pulsed beams, from their continuous wave forms. At the output of optical medium 216, the three pulses 213, 215, and 217 are split, using a WDM 222, onto separate modulation paths 224, 226, and 228 in the form of optical fibers or any other suitable optical mediums. In some other embodiments, WDM 222 may include a network of WDMs. Each individual pulse is sent through its own optical amplitude modulators ($AM_1$, $AM_2$ & $AM_{LO}$) which allows the user to generate independent pulse shapes for each of the three wavelengths. The modulators $AM_1$, $AM_2$ & $AM_{LO}$ may be any one, or combinations, of Mach-Zehnder Interferometer, phase modulator, amplitude modulator, intensity modulator, in-phase and quadrature (I/Q) modulator, or any other suitable modulators depending on the desired pulse modulation. The modulators can be driven by digital pulse-generators or arbitrary waveform generators (AWG) that allows a user to control the timing and temporal shape of each pulse. Optionally, each modulation path 224, 226, and 228 may also include an optical attenuator (not shown), allowing independent control of the optical power of each beam.

The ability to independently modulate individual beams is desirable for efficiently generating high fidelity squeezed states of light. In prior art systems that employ continuous-waves beams, it is not possible to manipulate the individual beams, including introducing temporal walk-offs. Advantageously, the modulation module 220 as described herein may allow individualized pulse shape manipulation and thereby enable measurement of pulsed, squeezed states of light used in quantum information processing.

In some further embodiments, one or more pulsed Erbium-Doped Fiber Amplifier (EDFA) (not shown) may be used to increase the power of P1, P2 and LO beams in preparation for squeezing generation and photon measurement. In some embodiments, the three beams are combined into a single optical fiber through WDM filter(s) before being seeded into an EDFA. In such embodiments, additional delay in the time domain between the three beams, also known as a "temporal walk-off", is set among the P1, P2, and LO beams to avoid any nonlinear interaction inside the EDFA. In other embodiments, each beam may go through a separate EDFA, in which case temporal walk-off is not needed.

After modulation, the three beams 213, 215, and 217 are recombined using a WDM 232 onto a single optical medium, such as an optical fibre, to produce a three-pulsed optical beam onto one optical path to be received by the detection module 230. Each of the modulated beams P1 213, P2 217, and LO 215 may experience noise during modulation. For example, since the three beams 213, 215, and 217 were separated and modulated independently, the modulation module 220 effectively forms a three-arm interferometer, the optical phase of each of the beams in their respective arm of the interferometer can drift over time due to environmental fluctuations. The drift may cause the three beams to be out of phase.

In order to mitigate against the phase drift of each of the three beams in the interferometer, phase locking is implemented within the phase detection module 230. A fraction of the total power of the combined pulsed optical beam (also referred to as a phase detection beam 233) at the output of WDM 232 is diverted, such as through an optical directional coupler 235, to be used for a feedback loop that adjusts the phase relation between the three modulated beams within the modulation module 220. In an exemplary embodiment, 10% of the power of the combined pulsed beam is diverted, through a 90:10 optical directional coupler 235, as the phase detection beam 233.

The phase detection beam 233 is fed through a second nonlinear optical medium 234. In some embodiments, as shown in FIG. 2, the nonlinear optical medium 234 is a NLF characterized by third-order optical susceptibility. Since the phase detection beam 233 is a three-pulsed beam having three input pulses at the wavelengths that corresponds to those of P1 213, LO 215, and P2 217, the nonlinear optical medium 234 can conceptually be understood as functioning as a parametric amplifier. For example, in the presence of P1 and P2 in the nonlinear optical medium, the LO beam will experience phase-dependent amplification, whereby one photon is absorbed from each P1 and P2, to generate two photons at the LO wavelength. The parametric gain, G of the amplification process is a sinusoidal function in the form of:

$$G = \cosh(\varphi_{nl})[1+\tanh(\varphi_{nl})\sin(\Delta\varphi)] \quad \text{Equation (2)}$$

Where $\Delta\varphi$ is the relative phase difference between the three incident beams P1, P2, and LO such that $\Delta\varphi = \varphi_1 + \varphi_2 - 2\varphi_{LO}$, and $\varphi_{nl}$ is the nonlinear phase shift experienced by the LO.

In order to observe a phase-sensitive gain of the combined beam within nonlinear optical medium 234, the beams P1 213, P2 217, and LO 215 need to be overlapping both in polarization and temporal domain at the input of the nonlinear medium 234. The temporal overlap may be achieved by controlling the timing of the pulse-generators or AWGs driving the AMs in the modulation module 220 by adding a temporal linear phase in the pulse shape in frequency domain. The polarization overlap between the three beams 213, 215, and 217 may be achieved by using polarization controllers (not shown) on any two of the three modulation interferometer arms or modulation paths 224, 226, and 228.

At its output, the second nonlinear optical medium 234 outputs a phase detection signal 235 representative of the phase detection beam 233 amplified by a factor of G. The power value in any one of the three beams (i.e. 213, 215, and 217) within the phase detection signal 235 may serve as a measure of the phase difference between the three incident beams in accordance with Equation (2), and can consequently be used to generate an error correction signal for feedback and stabilization of the modulation module interferometer. The phase detection signal 235 is split into its frequency components that match those of P1, P2, and LO by a WDM 236. The power of any one of the three frequency components may be measured to determine the phase-sensitive gain (G) by a detector 238. By way of a non-limiting example, the detector 238 may be a photodetector (PD), which provides an output signal 240 as the detected power value of one of the frequency components of the phase detection signal 235.

The output signal 240 of the detector 238 is demodulated by a proportional-integral-derivative (PID) controller 242. A phase-lock target is set in the PID controller 242. Based on a comparison between the output signal 240 and the phase-lock target, the PID controller 242 generates an error correction signal 244 used to perform phase adjustment in the modulation module 220. In some embodiments, the error correction signal 244 drives a phase modulator 246 placed on one of the modulation paths, such as modulation path 228 shown in FIG. 2, to shift the phase of the interferometer in the modulation module 220 in a corrective direction to counteract any fluctuations in $\Delta\varphi$. It is understood that the phase-modulator 246 may be placed onto any one of the three modulation interferometer arms, namely modulation paths 224, 226, and 228 as the corrective adjustment would be reflected in $\Delta\varphi$ as measured by phase detection signal 235. The phase modulator may be implemented using a PZT phase modulator shown in FIG. 2 or any other suitable phase shifter.

As the gain (G) is a sinusoidal function of the voltage applied to the phase modulator 246, the phase-lock target may be set in the PID controller 242 to be at any suitable value between $\Delta\varphi=-\pi/2$ and $\Delta\varphi=\pi/2$. Any suitable phase stabilization technique may be used. By way of a non-limiting example, the phase locking may be set at the peak value of the sinusoidal gain function in Equation (2) (i.e. $\Delta\varphi=0$) using the dithering technique when the derivative of the gain function is at 0. Any deviation would be represented by a non-zero derivative value, and the positive or negative sign associated with the derivative value provides an indication of the direction of derivative increase. Hence, a corresponding counteractive phase correction may be applied by the phase modulator 246 to achieve a 0 derivative. In further embodiments, a lock-in technique may be used where the phase of one of the interferometer arms is weakly modulated at a known frequency and the amplitude of the resulting modulation as measured by detector 238 is used as an error signal. This technique allows the interferometer in the modulation module 220 to be stabilized at $\Delta\varphi=\pm\pi/2$. In some further still embodiments, a linear combination of the dithering and lock-in techniques can allow one to stabilize the interferometer at any desired phase.

In exemplary embodiments, the phase modulator 246 is of a piezo-electric ceramic material such as a lead-zirconate-titanate (PZT) where the error correction signal 244 (i.e. in the form of a voltage from PID controller 242) causes physical deformation (i.e. radial expansion or contraction) of the PZT. The optical medium (i.e. optical fibre) forming the optical path between PID controller 242 and modulation path 228 may be wound one or more times around the PZT phase modulator 246 such that any physical deformation of the PZT causes the modulation path length to vary and thereby varying the phase of the optical signal travelling within the modulation path.

The remainder of the output signal from optical directional coupler 235, namely output signal 248, is received by state generator 120 to generate squeezed states of light. Specifically, the output signal 248, which includes pulsed beams P1 213, LO 215, and P2 217, is directed to one or more squeezers within the state generator 120. In some embodiments, the output signal 248 may be divided to separate out the individual frequency components to produce balanced pump beams. The division can be realized by a set of beam splitter trees. In some embodiments, the division can be realized by an interferometer network. It is also beneficial to have independent control over the optical power of each output pump beam (e.g., using Reconfigurable Beam Splitters (RBSs)) before the pump beam is directed to the squeezers. The one or more squeezers are configured to generate squeezed light with tunable squeezing.

As described above, up to 10% of the pump beam power (at output of WDM 232) is diverted for the feedback loop, thereby leaving the output signal 248 having at least 90% of the pump beam power. In some embodiments, it may be advantageous to divert as large a fraction of the pump beam power for squeezed light generation inside the squeezers as possible (e.g., about 99% or more). Such diversion has at least two benefits. First, the diversion can provide optical information on the squeezer status via the post-squeezer pump light for monitoring and locking. Second, the diversion can reduce or avoid noise generated after the squeezer from unwanted nonlinear effects driven by the pump light, such as spontaneous Raman scattering or four-wave mixing.

Figure 4:
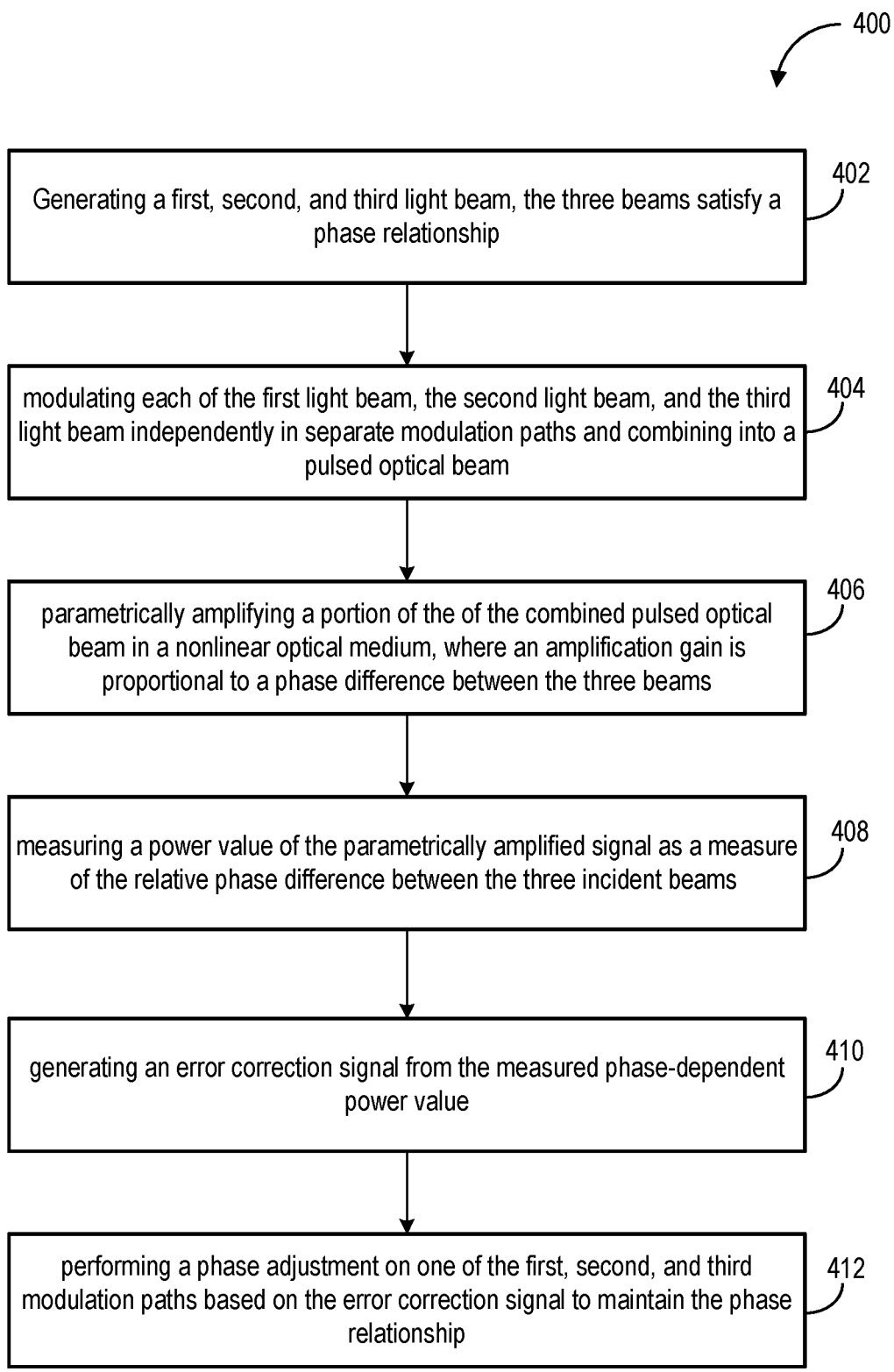
FIG. 4 illustrates a flowchart diagram of an example method of pulsed optical beam generation in accordance with an embodiment of the present disclosure.

FIG. 4 shows a flowchart illustrating a method 400 of generating a pulsed optical beam, according to an embodiment of the present disclosure.

The method 400 includes, at 402, providing a first light beam, a second light beam, and a third light beam, where the first, second, and third light beams satisfy a phase relationship. In some embodiments, the system may utilize a dual-pump configuration wherein step 402 includes providing a first pump beam in the form of a continuous-wave laser beam having angular frequency $\omega_1$ and phase angle $\varphi_1$, and providing a LO beam in the form of a continuous-wave laser beam having angular frequency $\omega_{LO}$ and phase angle $\varphi_{LO}$. The step further includes the first pump beam and the LO beam undergoing a parametric process within a nonlinear optical medium characterized with third-order nonlinear optical susceptibility to generate a second pump beam. By way of a non-limiting example, the optical medium may be a NLF made from materials such as silicon nitride, silicon, silica, lithium niobate, and aluminum nitride that have a third-order non-linear optical susceptibility.

The parametric process may be a StFWM process to generate the second pump beam. In some embodiments, the three beams are at a frequency of approximately 1.25 THz at 1550 nm with each two adjacent beams separated by at least 10 nm. Through the parametric process, the second pump beam is characterized as having an angular frequency of $\omega_2$ and phase angle $\varphi_2$. The second pump beam is generated in a phase-stable manner in that its phase relationship with respect to the first pump beam and the LO beam is consistent, thereby removing the need for a high-bandwidth optical phase locked loop (OPLL) to stabilize laser phase noise. In some embodiments, the StFWM process inside the optical medium ensures that the three beams are equally spaced in frequency space and intrinsically satisfy the phase condition $\varphi_1+\varphi_2=2\varphi_{LO}$.

In a further embodiment, the step 402 includes providing a first beam by a first pump, providing a second beam by a second pump, and providing a third beam by a third pump. The three beams' phase relationship is established by independently phase locking each of the three beams to a desired beam generated by a frequency comb.

In a further still embodiment, the generating step 402 includes generating a plurality of equally spaced beams near a desired frequency range (i.e. 1.25 THz at 1550 nm) by a frequency comb. Then, beams at desired frequencies, such as those matching the first pump beam, the LO beam, and the second pump beam are selected using individual band pass filters.

At step 404, each of the first beam, second beam, and LO beam is modulated individually on a separate modulation path to generate a pulsed beam. During the modulating step 404, each of the beams may be modulated or constructed using optical amplitude modulators into a desired pulse shape, such as pulsed beams, from their continuous waveform. The modulation step 404 may further include adding a temporal delay (or a temporal walk off) between the beams. The three modulated beams are outputted as a single combined pulsed beam with three frequency components.

At step 406, a portion of the of the combined pulsed optical beam (i.e. 10% of the total power) is parametrically amplified in a nonlinear optical medium, where the amplification gain is proportional to a phase difference between the three beams. The nonlinear optical medium may be conceptually understood as functioning as a parametric amplifier whose gain is directly proportional to the relative phase difference ($\Delta\varphi$) of the three beams as determined by $\Delta\varphi=\varphi_1+\varphi_2-2\varphi_{LO}$.

At step 408, the power value of the amplified signal is measured, such as by using a photo-detector (PD). The measured power value is indicative of the relative phase difference between the three incident beams.

At 410, an error correction signal is generated from the measured power value to counteract fluctuations in the combined pulsed optical beam. The error correction value may be demodulated by a PID controller using standard dither and lock-in amplification techniques, to stabilize the phase of the detected phase-dependent power value to the peak or valley of the gain profile. In some embodiments, step 410 further includes overlapping the three beams both in polarization as well as in the temporal domain. The beams may be temporally overlapped by controlling timing of the pulse-generators or AWGs driving the amplitude modulators in the modulation path of each of the beams. The beams may be overlapped in polarization by using polarization controllers on any two of the three modulation paths of the beams via a photodetector.

At 412, a phase adjustment is made on any one of the three modulation paths of the three incident beams, namely P1, P2, and LO, to maintain the phase relationship between the three beams. The error correction signal generated from 410 drives a phase-modulator placed on any one of the modulation paths where the phase-modulator may adjust the phase of the one of the three incident beams in order to maintain the relative phase relationship of $\varphi_1+\varphi_2-2\varphi_{LO}$ of the pulsed optical beam.

The remaining fraction of the pulsed optical beam (i.e. the beam containing 90% of the total beam power) is received by a state generator for generating squeezed states of light. One or more squeezers of the state generator are configured to convert the pulsed optical beam into one or more squeezed states of light.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A pump source for generating pulsed optical beam, the pump source comprising:
   a generation module configured to provide a first light beam, a second light beam, and a third light beam, where the first light beam, the second light beam, and the third light beam satisfy a phase relationship, wherein the phase relationship is a relative phase difference between the first light beam, the second light beam, and the third light beam;
   a modulation module, wherein each of the first light beam, the second light beam, and the third light beam are independently modulated in a first modulation path, a second modulation path, and a third modulation path, respectively, the modulated first, second, and third light beams are combined into a pulsed optical beam;
   a detection module configured to:
      parametrically amplify a portion of the combined pulsed optical beam, where an amplification gain is proportional to a phase difference between the first, second, and third modulated light beams;
      generate an error correction signal based on a power value of the amplified beam; and
      perform a phase adjustment based on the error correction signal on one of the first, second, and third modulation paths to maintain the phase relationship.

2. The pump source of claim 1, wherein the detection module further includes a nonlinear optical medium characterized by a non-linear optical susceptibility, wherein the portion of the pulsed beam is parametrically amplified within the optical medium.

3. The pump source of claim 1, wherein the first light beam, the second light beam, and the third light beam overlap in one or more of polarization and temporal domain.

4. The pump source of claim 1, further comprising a phase modulator on the one of the first, second, and third modulation paths, wherein the phase modulation is driven by the error correction signal to apply the phase adjustment.

5. The pump source of claim 1 further comprises a demodulator to generate the error correction signal based on the amplified beam.

6. The pump source of claim 5, wherein the demodulator generates the error correction signal using one or more of dither and lock-in amplification techniques.

7. The pump source of claim 1, wherein the relative phase difference is expressed as $\Delta\varphi=\varphi_1+\varphi_2-2\varphi_{LO}$, where $\varphi_1$ is an angular frequency of the first light beam, $\varphi_{LO}$ is an angular frequency of the second light beam, and $\varphi_2$ is an angular frequency of the third light beam.

8. The pump source of claim 1, wherein the portion of the pulsed optical beam is 10% of a total power of the pulsed optical beam.

9. The pump source of claim 1, wherein the generation module further comprises:
   a first pump to generate the first light beam;
   a second pump to generate the second light beam; and
   a non-linear optical medium characterized by a non-linear optical susceptibility, wherein the first light beam and the second light beam undergo a parametric process to generate the third light beam.

10. The pump source of claim 1, wherein the generation module further comprises:
    a first pump configured to generate the first beam;
    a second pump configured to generate the second beam;
    a third pump configured to generate the third beam; and
    a frequency comb configured to generate at least a first frequency, a second frequency and a third frequency, where the first, second, and third frequencies satisfy the phase relationship;
    wherein the first beam, the second beam, and the third beam are phase locked onto the first frequency, the second frequency, and the third frequency, respectively.

11. A method of generating a pulsed optical beam, the method comprising:
    generating a first light beam, a second light beam, and a third light beam, where the first light beam, the second light beam, and the third light beam satisfy a phase relationship, wherein the phase relationship is a relative phase difference between the first light beam, the second light beam, and the third light beam;
    modulating each of the first light beam, the second light beam, and the third light beam independently in a first modulation path, a second modulation path, and a third modulation path, respectively, the modulated first, second, and third light beams are combined into a pulsed optical beam;
    parametrically amplifying a portion of the pulsed optical beam, wherein an amplification gain is proportional to a phase difference between the first, second, and third modulated light beams;
    generating an error correction signal from a power value of the amplified beam; and
    performing a phase adjustment on one of the first, second, and third modulation paths based on the error correction signal to maintain the phase relationship.

12. The method of claim 11, wherein the parametric amplifying includes amplifying the portion of the pulsed optical beam through stimulated four-wave mixing (StFWM).

13. The method of claim 11 further includes overlapping the first light beam, the second light beam, and the third light beam in one or more of polarization and temporal domain.

14. The method of claim 11 further includes demodulating the amplified beam to generate the error correction signal.

15. The method of claim 14 wherein the demodulating further includes applying one or more of dither and lock-in techniques.

16. The method of claim 11 wherein the performing an error adjustment further includes driving a phase modulator placed on the one of the first modulation path, the second modulation path, and the third modulation path with the error correction signal to maintain the phase relationship.

17. The method of claim 11, wherein the relative phase difference is expressed as $\Delta\varphi=\varphi_1+\varphi_2-2\varphi_{LO}$, where $\varphi_1$ is an angular frequency of the first light beam, $\varphi_{LO}$ is an angular frequency of the second light beam, and $\varphi_2$ is an angular frequency of the third light beam.

18. The method of claim 11, wherein the generating step further includes:
    generating the first light beam by a first pump;
    generating the second light beam by a second pump; and
    generating the third light beam by an optical medium characterized by a non-linear optical susceptibility, wherein the first light beam and the second light beam undergo a parametric process within the optical medium to generate the third light beam.

19. The method of claim 11, wherein the generating step further includes:
    generating the first light beam by a first pump;
    generating the second light beam by a second pump;
    generating the third light beam by a third pump;
    generating a first frequency, a second frequency, and a third frequency by a frequency comb, the first frequency, the second frequency, and the third frequency satisfying the phase relationship;
    phase locking the first beam, the second beam, and the third beam onto the first frequency, the second frequency, and the third frequency, respectively.

* * * * *